(12) United States Patent
Pourshahid et al.

(10) Patent No.: US 8,812,974 B2
(45) Date of Patent: Aug. 19, 2014

(54) COMBINED PROPERTIES DIALOG FROM DIFFERENT SOURCES

(75) Inventors: Alireza Pourshahid, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/183,307

(22) Filed: Jul. 14, 2011

(65) Prior Publication Data

US 2012/0089939 A1   Apr. 12, 2012

(30) Foreign Application Priority Data

Oct. 6, 2010  (CA) ..................................... 2716843

(51) Int. Cl.
*G06F 3/048* (2013.01)
*G06F 3/01* (2006.01)

(52) U.S. Cl.
USPC ........... 715/777; 715/744; 715/763; 715/764; 715/766

(58) Field of Classification Search
CPC .... G06F 3/0481; G06F 3/0483; G06F 3/0484
USPC ........................ 715/744, 763, 766, 777, 764
See application file for complete search history.

(56) References Cited

U.S. PATENT DOCUMENTS

| 6,237,004 | B1 * | 5/2001 | Dodson et al. ........................... 1/1 |
| 7,934,162 | B2 * | 4/2011 | Wong et al. .................... 715/747 |
| 8,365,082 | B2 * | 1/2013 | Skirpa ............................ 715/760 |
| 2003/0071860 | A1 * | 4/2003 | Goddard et al. .............. 345/866 |
| 2003/0222918 | A1 * | 12/2003 | Coulthard ....................... 345/780 |
| 2004/0216042 | A1 * | 10/2004 | Consolatti et al. ............. 715/513 |
| 2005/0076306 | A1 * | 4/2005 | Martin et al. .................. 715/747 |
| 2005/0125787 | A1 * | 6/2005 | Tertitski et al. ................ 717/162 |
| 2005/0192771 | A1 | 9/2005 | Fischer et al. |
| 2005/0193368 | A1 * | 9/2005 | Becker et al. .................. 717/106 |
| 2005/0262085 | A1 | 11/2005 | Durocher et al. |
| 2006/0053411 | A1 | 3/2006 | Takamiya |
| 2008/0034314 | A1 | 2/2008 | Louch et al. |
| 2008/0235601 | A1 | 9/2008 | Fried et al. |
| 2008/0235629 | A1 * | 9/2008 | Porter et al. ................... 715/849 |
| 2009/0260022 | A1 * | 10/2009 | Louch et al. .................. 719/328 |
| 2009/0313601 | A1 | 12/2009 | Baird et al. |
| 2010/0235762 | A1 * | 9/2010 | Laiho et al. ................... 715/753 |
| 2011/0167097 | A1 * | 7/2011 | Onoda .......................... 707/822 |

OTHER PUBLICATIONS

Canadian Office Action from Application Serial No. 2,716,843 dated Apr. 9, 2013 (3 pages).

* cited by examiner

*Primary Examiner* — Nicholas Augustine
(74) *Attorney, Agent, or Firm* — Shumaker & Sieffert, P.A.

(57) ABSTRACT

An illustrative embodiment of a computer-implemented method to manage properties in a dialog from various sources creates a widget properties dialog and receives properties and validation rules from each source associated with the widget properties dialog to form received information. The computer-implemented method further creates a group of tabs in the widget properties dialog using the received information, wherein the group of tabs contains a general tab and a group of content tabs, wherein each content tab is specific to an instance of content provider and content type.

17 Claims, 8 Drawing Sheets

_US 8,812,974 B2_

COMBINED PROPERTIES DIALOG FROM DIFFERENT SOURCES

TECHNICAL FIELD

This disclosure relates generally to graphical user interfaces in a data processing system.

BACKGROUND

Recently efforts in software development have been directed toward building mash-up environments to address needs of users to have content/widgets from several sources of information. The widgets need to be interactive and customizable. The widgets usually have properties enabling user customization.

In most portals, dashboard, and mash-up environments, each widget has an associated properties page, which may also be referred to as an edit mode. Because the widgets originate from different sources, the edit modes of a respective widget usually appear differently (visually) and behave differently from an interaction point of view. Therefore, the behavior issue and appearance issue may cause an overall application look and feel to be inconsistent confusing average business users and increasing the slope of the learning curve.

Furthermore, in a dashboard and mash-up environment, typically two groups of properties are present. Properties specific to content provided by the sources of the widget form one group and properties related to widgets look and feel and interaction with the remaining widgets and environments provided by the application. In typical portal and dashboard environments, the two types of properties are usually separated, referenced by different names, and accessed from different places.

BRIEF SUMMARY

According to one embodiment, a computer-implemented method to manage properties in a dialog from various sources creates a widget properties dialog and receives properties and validation rules from each source associated with the widget properties dialog to form received information. The computer-implemented method further creates a group of tabs in the widget properties dialog using the received information, wherein the group of tabs contains a general tab and a group of content tabs, wherein each content tab is specific to an instance of content provider and content type.

According to one embodiment, a computer program product comprises a computer-readable medium containing computer executable program code stored thereon. The computer executable program code comprises computer executable program code to create a widget properties dialog, computer executable program code to receive properties and validation rules from each source associated with the widget properties dialog to form received information, and computer executable program code to create a group of tabs in the widget properties dialog using the received information, wherein the group of tabs contains a general tab and a group of content tabs, wherein each content tab is specific to an instance of content provider and content type.

According to one embodiment, an apparatus for managing properties in a dialog from various sources comprises a communications fabric, a memory coupled to the communications fabric, wherein the memory contains computer executable program code, a communications unit coupled to the communications fabric, an input/output unit coupled to the communications fabric, a display coupled to the communications fabric and a processor unit coupled to the communications fabric. The processor unit executes the computer executable program code to cause the apparatus to create a widget properties dialog, receive properties and validation rules from each source associated with the widget properties dialog to form received information and create a group of tabs in the widget properties dialog using the received information, wherein the group of tabs contains a general tab and a group of content tabs, wherein each content tab is specific to an instance of content provider and content type.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
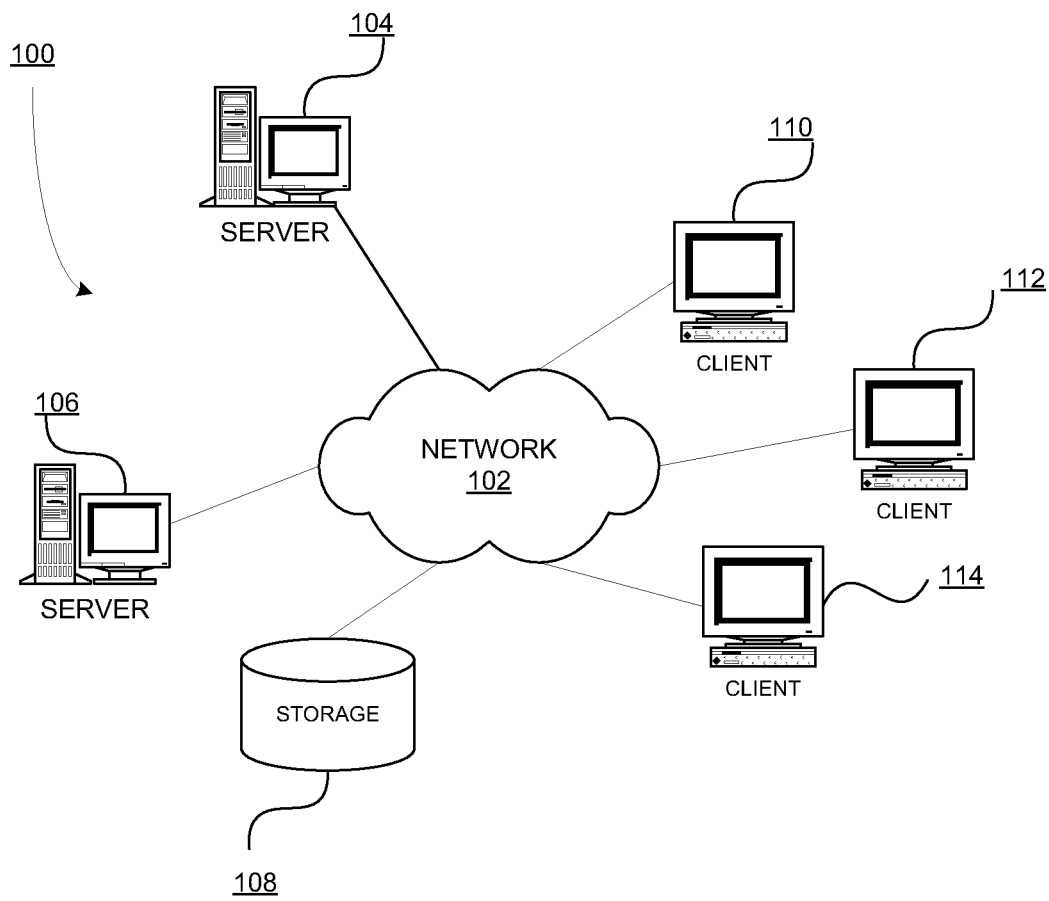
FIG. 1 is a block diagram of an example data processing system network operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages as well as Web-based programming language or scripting languages such as JavaScript™. Java and all Java-based trademarks and logos are trademarks of Oracle Corporation and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be coupled to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
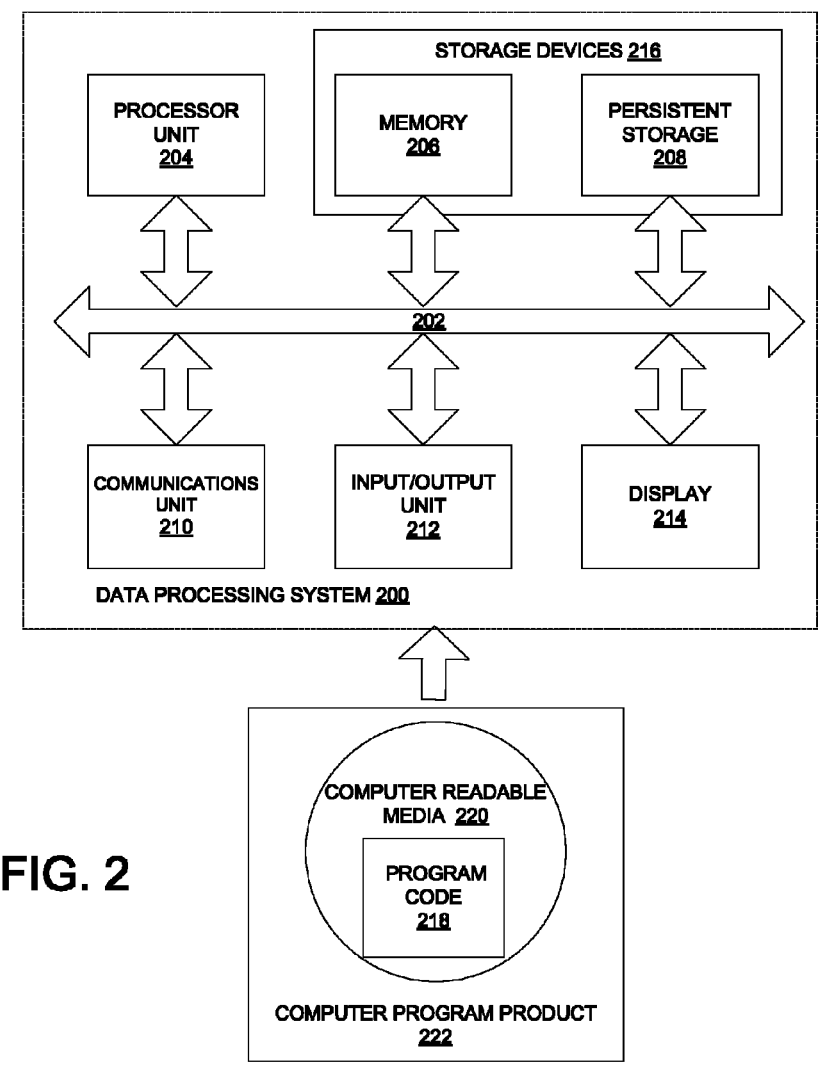
FIG. 2 is a block diagram of an example data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers coupled together within network data processing system 100. Network 102 may include connections, such as wire, wireless communication links, or fiber optic cables.

In the depicted example, server 104 and server 106 are coupled to network 102 along with storage unit 108. In addition, clients 110, 112, and 114 are coupled to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a group of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be coupled to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is coupled to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example a server such as server 104 and a client such as client 110, both of FIG. 1, may be implemented on representative systems either separately or on the same system. For example, according to one embodiment, a computer-implemented process for managing properties in a dialog from various sources is presented. The disclosed process may be implemented in a single computer environment, however is not limited to such an environment and may be implemented on a networked computer environment or combination thereof. Processor unit 204 of server 104 of network data processing system 100 of FIG. 1 creates a widget properties dialog and receives properties and validation rules from each source associated with the widget properties dialog through communication unit 210, input/output unit 212 or from storage devices 216 to form received information. Processor unit 204 further creates a group of tabs in the widget properties dialog using the received information, wherein the group of tabs contains a general tab and a group of content tabs, wherein each content tab is specific to an instance of content provider and content type.

In another example, a computer-implemented process, using program code 218 stored in memory 206 or as a computer program product 222, for managing properties in a dialog from various sources comprises a computer recordable storage media, such as computer readable media 220, containing computer executable program code stored thereon. The computer executable program code comprises computer executable program code for managing properties in a dialog from various sources.

In another illustrative embodiment, the process for managing properties in a dialog from various sources may be implemented in an apparatus comprising a communications fabric, a memory coupled to the communications fabric, wherein the memory contains computer executable program code, a communications unit coupled to the communications fabric, an input/output unit coupled to the communications fabric, a display coupled to the communications fabric, and a processor unit coupled to the communications fabric. The processor unit of the apparatus executes the computer executable program code to direct the apparatus to perform the process for managing properties in a dialog from various sources.

Embodiments of the disclosed process enable presentation of properties from different sources on a tabbed dialog invoked from one place with content of all tabs having a same look and behavior.

Figure 3:
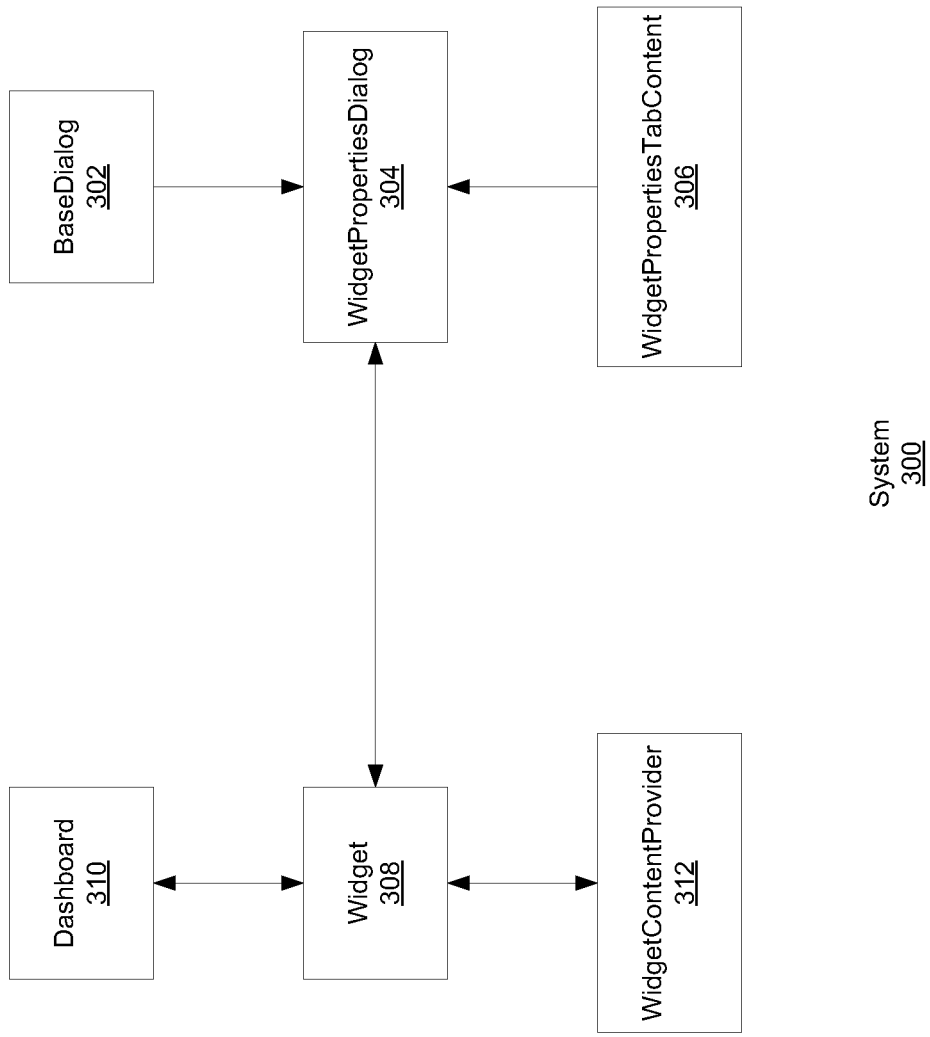
FIG. 3 is a block diagram of a dialog management system, in accordance with one embodiment of the disclosure.

With reference to FIG. 3, a block diagram of a dialog management system, in accordance with various embodiments of the disclosure is presented. System 300 is an example of a dialog management system enabling presentation of properties from different sources on a tabbed dialog invoked from one place with content of all tabs having a same look and behavior.

System 300 comprises a number of components supported by a data processing system such as data processing system 200 of FIG. 2 including BaseDialog 302, WidgetPropertiesDialog 304, WidgetPropertiesTabContent 306, Widget 308, Dashboard 310 and WidgetContentProvider 312. Using an exemplary class-based implementation, BaseDialog 302 provides a foundation upon which WidgetPropertiesDialog 304 is built. There is only one instance of BaseDialog 302. WidgetPropertiesDialog 304 inherits features of BaseDialog 302.

WidgetPropertiesDialog 304 is a hybrid dialog containing specifications for managing dialog properties specific to a content provider as well as dialog properties associated with the environment in which the dialog functions. There may be a group of WidgetPropertiesTabContent 306 tabs within WidgetPropertiesDialog 304. Each tab of WidgetPropertiesTabContent 306 represents specifications for an individual content provider.

Widget 308 is an artifact presented as a visual control in a user interface, including Dashboard 310. There may be a group of widgets represented by one or more Widget 308 presented by a graphical user interface including an instance of DashBoard 310. Widget 308 receives information regarding presentation requirements from the presentation environment of Dashboard 310 that will be common across widgets. Widget 308 also receives information regarding content from a group of content providers represented as one or more respective WidgetContentProvider 312.

Figure 4:
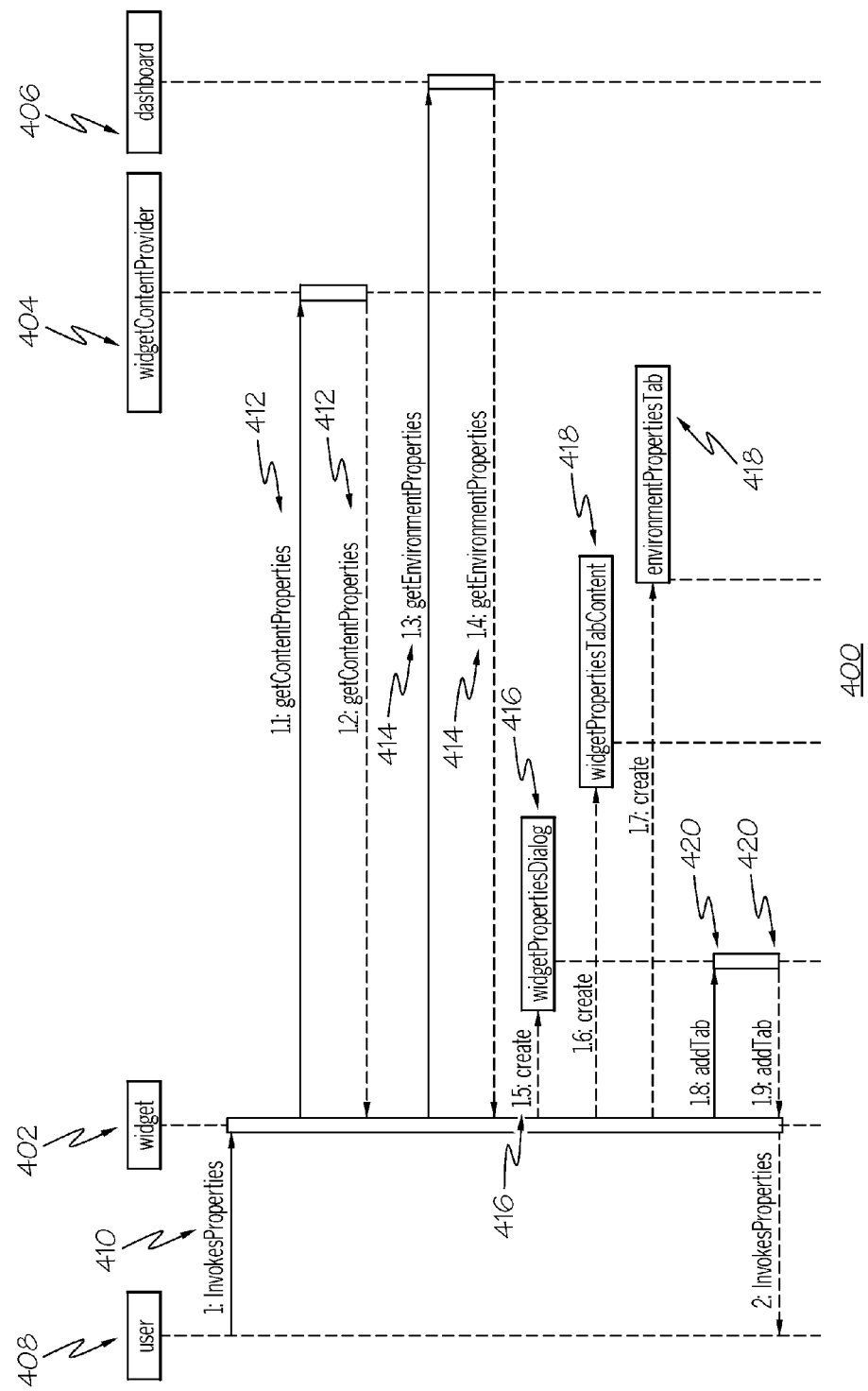
FIG. 4 is an operation sequence diagram using the process of the dialog management system of FIG. 3, in accordance with one embodiment of the disclosure.

With reference to FIG. 4, an operation sequence diagram, in accordance with one embodiment of the disclosure is presented. Operation sequence 400 represents an example of a process using the dialog management system of system 300 of FIG. 3.

Operation sequence 400 is a group of operations to manage Widget 402 through a series of interactions with a user such as User 408 to obtain information using WidgetContentProvider 404 and Dashboard 406.

In the example depicted, User 408 requests, InvokesProperties 410, the properties of each source, in this case WidgetContentProvider 404 and Dashboard 406. An event is fired, such as getContentProperties 412 and getEnvironmentProperties 414 in which in response to the event properties as well as the validation rules for each tab are returned from the appropriate sources to Widget 402 using a JavaScript™ Object Notation (JSON) object.

Widget 402 creates the properties dialog, widgetPropertiesDialog 416, and tabs, widgetPropertiesTabContent and environmentPropertiesTab 418 using information received from different sources of WidgetContentProvider 404 and Dashboard 406. The widget properties dialog is then displayed. Tabs may be added as well at this time, for example, in operation addTab 420.

When user 408 changes the properties and confirms the change, for example by clicking an OK button, each tab in the dialog is validated and an update sent to the associated source of each tab. The tabs are provided by either creating a new class inherited from WidgetPropertiesTabContent 418 passed by reference to the WidgetProperties dialog 416, or by using a factory to create a new WidgetPropertiesTabContent 418 based on a specification of the content passed in using extensible markup language (XML), JSON or another format. The tabs can be added dynamically even after the dialog is initially displayed. In this way Dashboard 406 is unaware of whether sources have properties, merely displays any property tab received.

Figure 5:
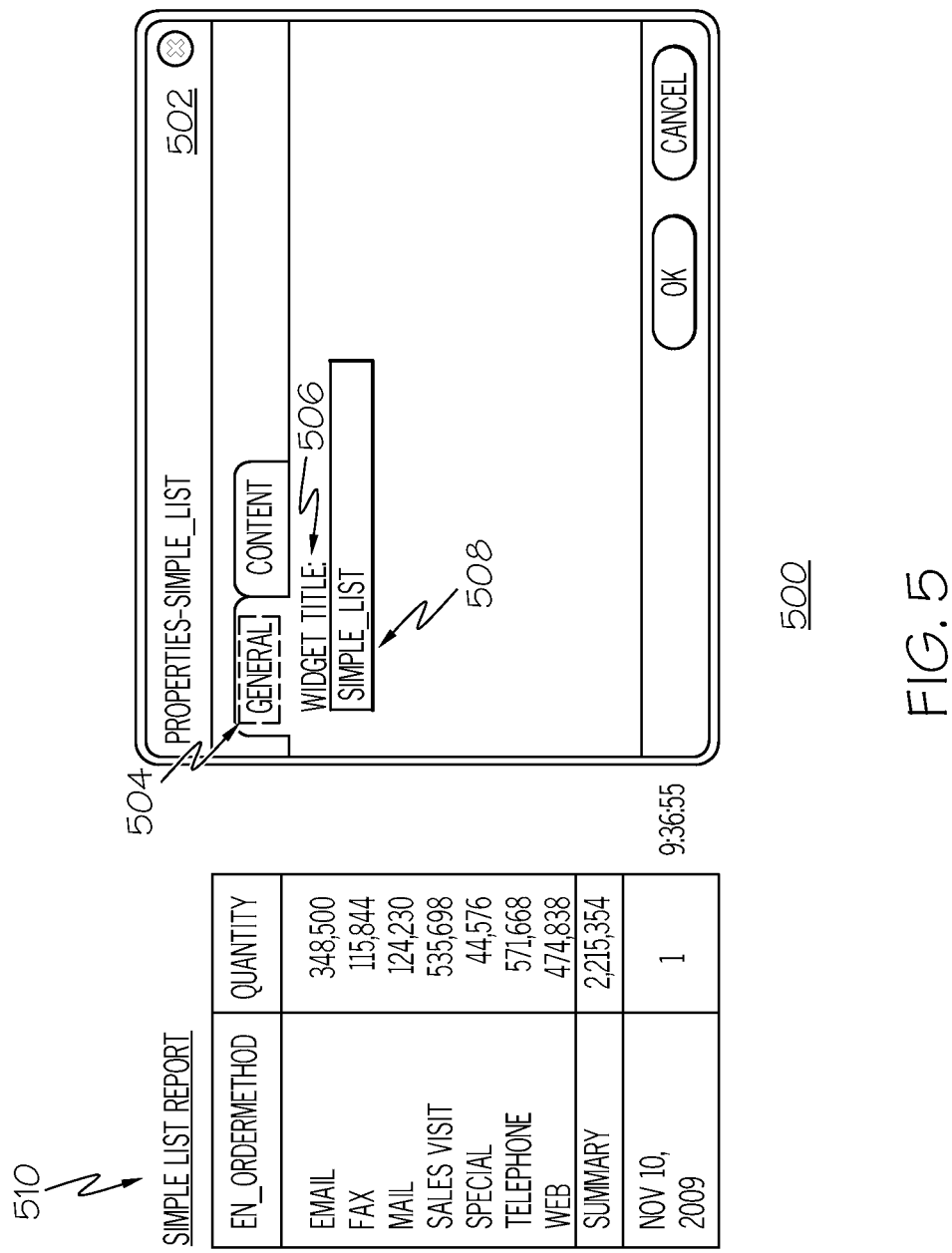
FIG. 5 is a screen shot of a user interface portion for a WidgetProperties dialog of FIG. 4 for handling common environment information, in accordance with one embodiment of the disclosure.

With reference to FIG. 5, a widget properties dialog, in accordance with one embodiment of the disclosure is presented. Dialog 500 represents an example using WidgetProperties dialog 416 of FIG. 4 for handling common environment information.

Dialog 500 is a representation of an interface to a group of operations to manage Widget 402 through a series of interactions with a user such as User 408 to obtain and change information using WidgetContentProvider 404 and Dashboard 406 of FIG. 4.

Label 502 provides a label, Properties—Simple_List, for the dialog to manage source information associated with Simple List Report 510. A tab, tab 504, labeled General, provides an interface to manage features or properties common to all information of Properties—Simple_List.

Widget title 506 is a heading indicating a title for the associated widget may be supplied. Element 508 is an input area containing the text of the widget title, in this example Simple_List. Additional properties, which are independent of the content provider including widget border style and color or widget title size can be added to the general tab.

Figure 6:
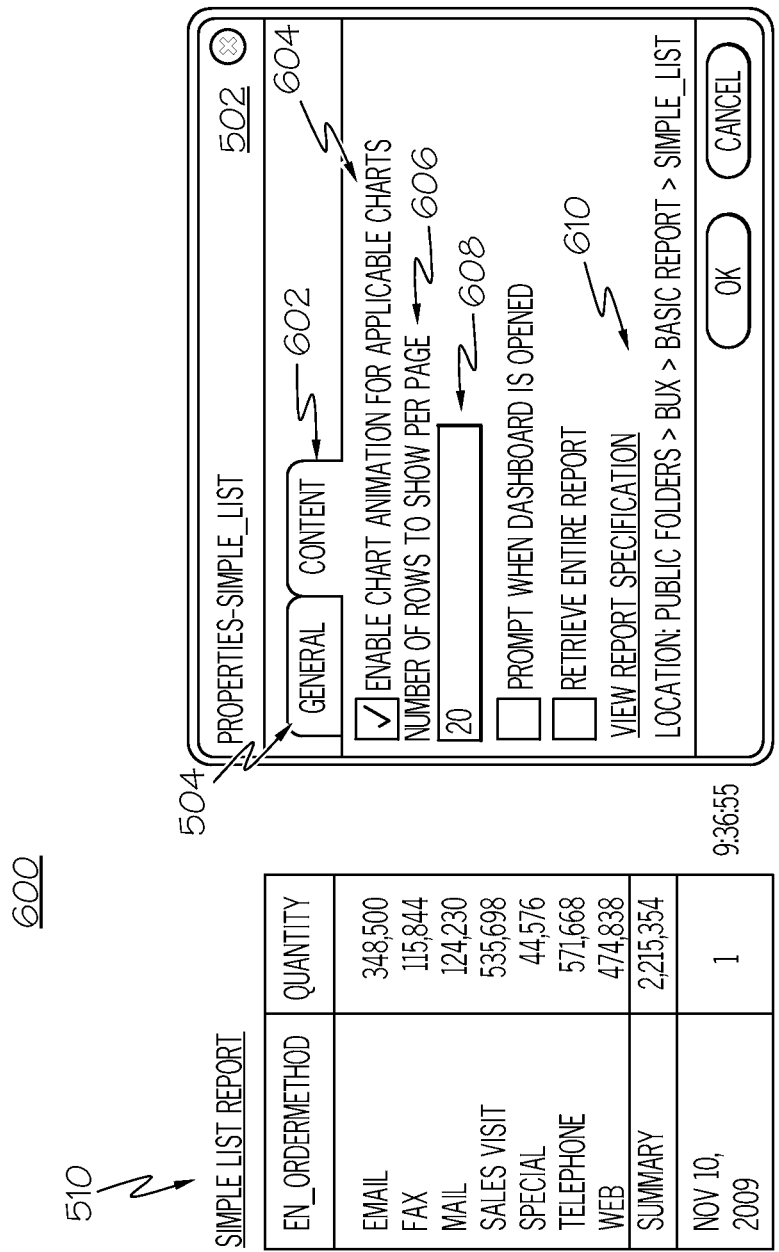
FIG. 6 is a screen shot of a user interface portion for a WidgetProperties dialog of FIG. 4 for content provider specific information, in accordance with one embodiment of the disclosure.

With reference to FIG. 6, a widget properties dialog, in accordance with one embodiment of the disclosure is presented. Dialog 600 represents an example using WidgetProperties dialog 416 of FIG. 4 for handling content provider specific information.

Dialog 600 is a further representation of the interface of dialog 500 of FIG. 5. Similar elements of FIG. 5 are presented including label 502, tab 504 and Simple List Report 510. An additional tab, tab 602, labeled Content, provides an interface to manage features or properties specific to content from a content provider for the Properties—Simple_List.

Element 604 represents a control used to enable chart animation for an associated chart. Element 606 is a text heading indicating a number of rows to be displayed per page. Element 608 is an input area containing the number of rows, in this example 20 described by element 606. Element 610 represents a control used to view the report specification located at the indicated location.

Figure 7:
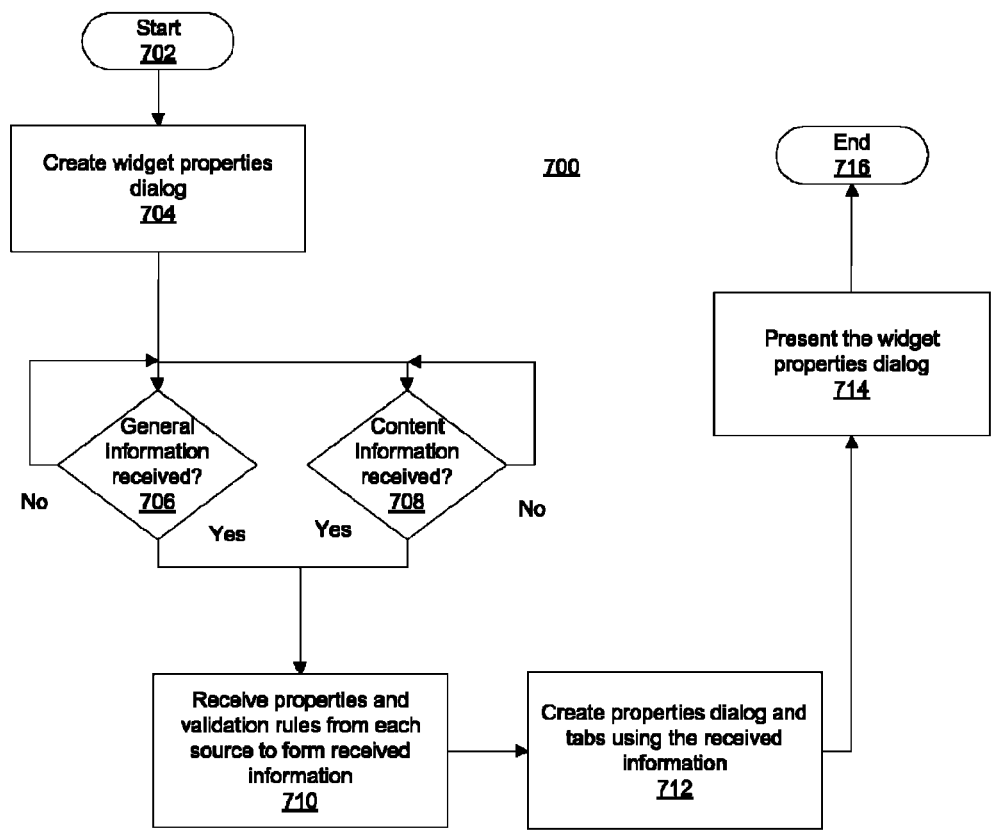
FIG. 7 is a flowchart of a process to create a widget properties dialog using the widget properties dialog system of FIG. 3, in accordance with one embodiment of the disclosure.

With reference to FIG. 7, a flowchart of a process to create a widget properties dialog, in accordance with one embodiment of the disclosure is presented. Process 700 represents an example using system 300 of FIG. 3 for handling widget properties information.

Process 700 starts (act 702) and creates a widget properties dialog (act 704). The request to create a widget properties dialog is typically initiated by a user but may also be performed by programmatic means. The request to create the widget properties dialog fires an event or events to obtain property information from content providers and the presentation environment. In the current class-based example, base features of the widget properties dialog are inherited from a base dialog object.

Responsive to the event of act 704, process 700 determines whether general information is received (act 706). When a determination is made that general information is not received process 700 loops back to perform act 706.

Concurrent with act 706, process 700 determines whether content information is received (act 708). When a determination is made that content information is not received process 700 loops back to perform act 706. Users of process 700 are therefore not blocked from further processing while waiting for information from content providers.

Responsive to a determination that general information is received or content information is received or a combination of general information and content information is received, process 700 receives properties and validation rules from each source to form received information (act 710). Property information from content providers and the presentation environment is received in one of a JavaScript Object Notation and a XML specification form. Receiving information in this format enables efficient processing due to a standardized format.

Process 700 creates a group of tabs in the widget properties dialog using the received information (act 712). A general tab is created for management of information common across the content providers associated with a presentation environment. A content tab specific to each instance of content provider and content type is also created. The dashboard application of the graphical user interface has no knowledge of the properties of the tabs yet the tabs look and behave similar to the general tab and each tab is invoked by a user using the same user interface action.

Process 700 presents the widget properties dialog (act 714) and terminates thereafter (act 716). Presentation is made to the requester when the requester is a user. However when invoked by programmatic means, a presentation is not expected, but the results may be stored for later use and an indication of operation completion is provided.

The disclosed process enables separate and independent receiving of information from the different types of sources of a common environment and content providers. Parallel or concurrent processing of receiving information regarding the common environment content provider neutral property information and content provider specific information allows the process to avoid blocking a user when information is not readily available. Current solutions typically block users from further processing while waiting for content information, whereas the disclosed process does not.

Figure 8:
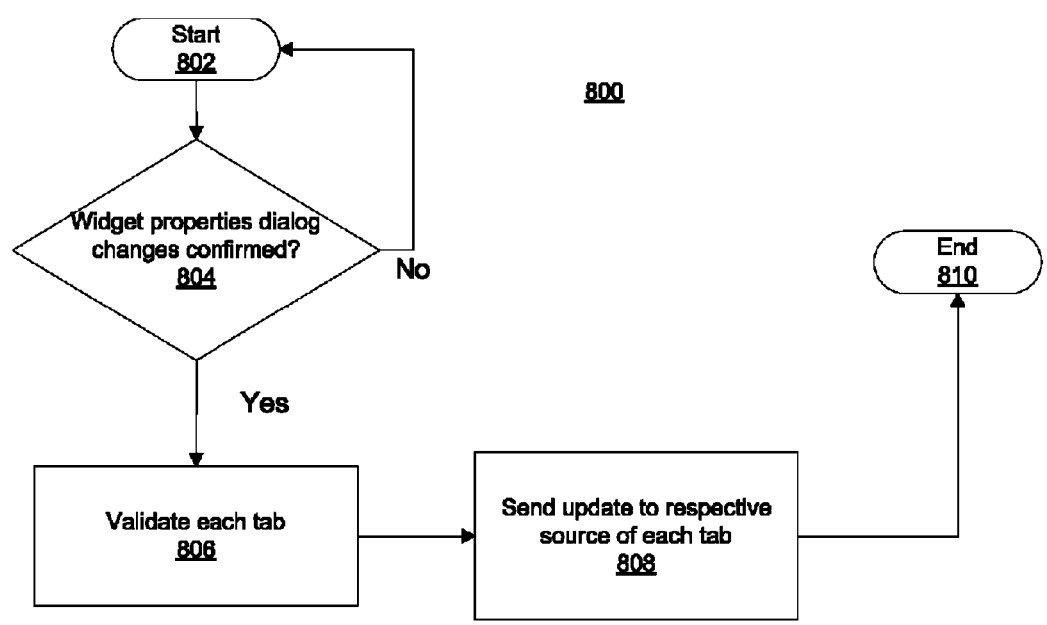
FIG. 8 is a flowchart of a process to change widget properties using the widget properties dialog system of FIG. 3, in accordance with one embodiment of the disclosure.

With reference to FIG. 8, a flowchart of a process to change widget properties, in accordance with one embodiment of the disclosure is presented. Process 800 represents an example using widget properties dialog 304 of FIG. 3 for managing widget properties information.

Process 800 starts (act 802) and determines whether widget properties dialog changes are confirmed (act 804). Process 800 presumes a change is made to properties associated with a widget properties dialog, typically initiated by a user but may also be performed by programmatic means. The change to the widget properties dialog includes property information from content providers and the presentation environment. For example, in a user initiated change, confirmation may typically be indicated by selecting Accept or OK in a dialog of a user interface.

Responsive to a positive confirmation, process 800 validates each tab (act 806). Property information from content providers and the presentation environment information may be changed as required.

Process 800 send updates to a respective source of each tab in the group of tabs in the widget properties dialog using the changed information (act 808). A general tab change includes updates to information common across the content providers associated with a presentation environment. A content tab change includes information specific to an instance of content provider and content type. Process 800 terminates thereafter (act 810).

Process 800 may present the widget properties dialog to the requester when the requester is a user. However when invoked by programmatic means, a presentation is not expected, but the results may be stored for later use and an indication of operation completion is provided.

Thus is presented in an illustrative embodiment a computer-implemented process for managing properties in a dialog from various sources. The computer-implemented process creates a widget properties dialog and receives properties and validation rules from each source associated with the widget properties dialog to form received information. The computer-implemented process further creates a group of tabs in the widget properties dialog using the received information, wherein the group of tabs contains a general tab and a group of content tabs, wherein each content tab is specific to an instance of content provider and content type.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of various aspects of the present invention have been presented for purposes of illustration and description, but is not intended to be exhaustive or limited to the invention in the form disclosed. Many modifications and variations will be apparent to those of ordinary skill in the art without departing from the scope and spirit of the invention.

Aspects of the invention can take the form of an entirely hardware embodiment, an entirely software embodiment or an embodiment containing both hardware and software elements. One embodiment is implemented in software, which includes but is not limited to firmware, resident software, microcode, and other software media that may be recognized by one skilled in the art.

While certain aspects of the present invention have been described in the context of a fully functioning data processing system, those of ordinary skill in the art will appreciate that the processes of various aspects of the present invention are capable of being distributed in the form of a computer readable medium of instructions and a variety of forms, regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The invention claimed is:

1. A computer-implemented method to manage properties in a dialog from various sources, the computer-implemented method comprising:
   creating, by one or more processors, a widget properties dialog;
   receiving properties and validation rules from each source of one or more sources that are associated with the widget properties dialog to form received information, wherein each source is one of a dashboard application or a content provider;
   creating, by the one or more processors, a group of tabs in the widget properties dialog using the received information, wherein the group of tabs contains a general tab and a group of content tabs, wherein the general tab is associated the dashboard application, wherein each content tab is specific to an instance of a content provider that comprises one of the one or more sources of the received information for the respective content tab, and wherein each content tab is specific to an instance of a content type that is associated with at least one content-specific feature of an object received from the instance of the content provider for the respective content tab;
   determining, by the one or more processors, whether a change to the widget properties dialog is confirmed, wherein the change includes one or more alterations to property information from the one or more sources;
   after the change to the widget properties dialog is confirmed, validating each tab in the group of tabs using the validation rules to generate a changed widget, wherein validating each tab comprises using the validation rules to validate the one or more alterations to the property information of the change; and
   presenting, by the one or more processors, the changed widget for display in a user interface.

2. The computer-implemented method of claim 1, wherein creating a widget properties dialog further comprises:
   inheriting base properties from a base dialog.

3. The computer-implemented method of claim 1, wherein receiving properties and validation rules from each source associated with the widget properties dialog to form received information further comprises:
   requesting properties from each source;
   determining whether general information and content information is received; and
   responsive to a determination that general information and content information is received, receiving the properties in one of a JavaScript Object Notation and a XML (extensible markup language) specification form.

4. The computer-implemented method of claim 1, wherein the general tab is further associated with information associated with information common across the group of content tabs.

5. The computer-implemented method of claim 1, wherein responsive to a positive confirmation, validating each tab using the validation rules further comprises:
   sending updates to a respective source of each tab in the group of tabs in the widget properties dialog using the change information.

6. The computer-implemented method of claim 1, further comprising:
   determining whether to present the widget properties dialog;
   responsive to a determination to present the widget properties dialog, presenting the widget properties dialog; and
   responsive to a determination to not present the widget properties dialog, storing the widget properties dialog.

7. A computer program product, comprising:
   a computer-readable medium containing computer executable program code stored thereon, the computer executable program code comprising:
   computer executable program code to create a widget properties dialog;
   computer executable program code to receive properties and validation rules from each source of one or more sources that are associated with the widget properties dialog to form received information, wherein each source is one of a dashboard application or a content provider;
   computer executable program code to create a group of tabs in the widget properties dialog using the received information, wherein the group of tabs contains a general tab and a group of content tabs, wherein the general tab is associated the dashboard application, wherein each content tab is specific to an instance of a content provider that comprises one of the one or more sources of the received information for the respective content tab, and wherein each content tab is specific to an instance of a content type that is associated with at least one content-specific feature of an object received from the instance of the content provider for the respective content tab;

computer executable program code to determine whether a change to the widget properties dialog is confirmed, wherein the change includes one or more alterations to property information from the one or more sources;

computer executable program code to validate each tab in the group of tabs using the validation rules to generate a changed widget after the change to the widget properties dialog is confirmed, wherein validating each tab comprises using the validation rules to validate the one or more alterations to the property information of the change;

computer executable program code to present the changed widget for display in a user interface.

8. The computer program product of claim 7, wherein computer executable program code to create a widget properties dialog further comprises:

computer executable program code to inherit base properties from a base dialog.

9. The computer program product of claim 7, wherein computer executable program code to receive properties and validation rules from each source associated with the widget properties dialog to form received information further comprises:

computer executable program code to request properties from each source;

computer executable program code to determine whether general information and content information is received; and computer executable program code, responsive to a determination that general information and content information is received, to receive the properties in one of a JavaScript Object Notation and a XML (extensible markup language) specification form.

10. The computer program product of claim 7, wherein the general tab is further associated with information associated with information common across the group of content tabs.

11. The computer program product of claim 7, wherein computer executable program code, responsive to a positive confirmation, to validate each tab using the validation rules further comprises:

computer executable program code to send updates to a respective source of each tab in the group of tabs in the widget properties dialog using the change information.

12. The computer program product of claim 11, wherein the computer-readable medium further contains:

computer executable program code to determine whether to present the widget properties dialog;

computer executable program code, responsive to a determination to present the widget properties dialog, to present the widget properties dialog; and computer executable program code, responsive to a determination to not present the widget properties dialog, to store the widget properties dialog.

13. An apparatus comprising:
a communications fabric;
a memory coupled to the communications fabric, wherein the memory contains computer executable program code;
a communications unit coupled to the communications fabric;
an input/output unit coupled to the communications fabric;
a display coupled to the communications fabric; and
a processor unit coupled to the communications fabric, wherein the processor unit executes the computer executable program code to cause the apparatus to:
create a widget properties dialog;
receive properties and validation rules from each source of one or more sources that are associated with the widget properties dialog to form received information, wherein each source is one of a dashboard application or a content provider;
create a group of tabs in the widget properties dialog using the received information, wherein the group of tabs contains a general tab and a group of content tabs, wherein the general tab is associated the dashboard application, wherein each content tab is specific to an instance of a content provider that comprises one of the one or more sources of the received information for the respective content tab, and wherein each content tab is specific to an instance of a content type that is associated with at least one content-specific feature of an object received from the instance of the content provider for the respective content tab;
determine whether a change to the widget properties dialog is confirmed, wherein the change includes one or more alterations to property information from the one or more sources;
after the change to the widget properties dialog is confirmed, validate each tab in the group of tabs using the validation rules to generate a changed widget, wherein validating each tab comprises using the validation rules to validate the one or more alterations to the property information of the change; and
present the changed widget for display in a user interface.

14. The apparatus of claim 13, wherein the processor unit executes the computer executable program code to create a widget properties dialog to further cause the apparatus to:
inherit base properties from a base dialog.

15. The apparatus of claim 13, wherein the processor unit executes the computer executable program code to receive properties and validation rules from each source associated with the widget properties dialog to form received information to further cause the apparatus to:
request properties from each source;
determine whether general information and content information is received; and
responsive to a determination that general information and content information is received, receive the properties in one of a JavaScript Object Notation and a XML (extensible markup language) specification form.

16. The apparatus of claim 13, wherein the general tab is further associated with information associated with a dashboard application and information common across the group of content tabs.

17. The apparatus of claim 13, wherein the processor unit executes the computer executable program code, responsive to a positive confirmation, to validate each tab using the validation rules to further cause the apparatus to:
send updates to a respective source of each tab in the group of tabs in the widget properties dialog using the change information;
determine whether to present the widget properties dialog;
responsive to a determination to present the widget properties dialog, present the widget properties dialog; and
responsive to a determination to not present the widget properties dialog, store the widget properties dialog.

* * * * *